US008596627B2

(12) United States Patent
Lands et al.

(10) Patent No.: US 8,596,627 B2
(45) Date of Patent: Dec. 3, 2013

(54) AUTOMOBILE ROTISSERIE

(75) Inventors: Donald Scott Lands, Clayton, IN (US); Samuel O. Dean, Spencer, IN (US)

(73) Assignee: Wurk Metal Products, Inc., Gosport, IN (US)

( * ) Notice: Subject to any disclaimer, the term of this patent is extended or adjusted under 35 U.S.C. 154(b) by 644 days.

(21) Appl. No.: 12/917,939

(22) Filed: Nov. 2, 2010

(65) Prior Publication Data

US 2011/0101586 A1 May 5, 2011

Related U.S. Application Data

(60) Provisional application No. 61/280,368, filed on Nov. 2, 2009.

(51) Int. Cl.
*B23Q 1/64* (2006.01)

(52) U.S. Cl.
USPC ................................ 269/57; 269/17; 254/2 B

(58) Field of Classification Search
USPC ........ 269/57, 17, 71, 136, 905; 254/2 B, 7 B, 254/10 B, 8 R, 134, 100
See application file for complete search history.

(56) References Cited

U.S. PATENT DOCUMENTS

| | | | | |
|---|---|---|---|---|
| 3,044,747 A * | 7/1962 | Nolden | 254/2 B |
| 5,051,056 A * | 9/1991 | Gibbons et al. | 414/678 |
| 5,632,475 A * | 5/1997 | McCanse | 269/17 |
| 6,024,348 A * | 2/2000 | Ventura et al. | 269/17 |
| 6,116,577 A * | 9/2000 | McCanse | 254/2 B |
| 7,377,502 B2 * | 5/2008 | Nikolic | 269/17 |
| 7,448,606 B1 * | 11/2008 | Johnson | 269/17 |
| 8,245,856 B1 * | 8/2012 | Pappin et al. | 211/13.1 |
| 2003/0062663 A1 * | 4/2003 | Fox | 269/17 |
| 2011/0101586 A1 * | 5/2011 | Lands et al. | 269/57 |

* cited by examiner

*Primary Examiner* — Lee D Wilson
(74) *Attorney, Agent, or Firm* — Woodard, Emhardt, Moriarty, McNett & Henry LLP

(57) ABSTRACT

An automobile rotisserie may include a pair of support columns, a neck clamp clamped to each support column, a rotation assembly attached to each neck clamp, a swing arm clamp attached to each rotation assembly, a swing arm received in and clamped by each swing arm clamp, a balancing assembly effective for controlling the movement and positioning of the swing arm within the swing arm clamp, and a mounting arm extending from each swing arm. Each neck clamp and/or swing arm clamp may include an L-shaped outer clamp plate and a W-shaped inner clamp plate. Each rotation assembly may include an outer sleeve attached to a neck clamp, an inner insert sleeve attached to a swing arm clamp, a plurality of ball bearings between the outer sleeve and the inner sleeve to facilitate rotational movement of the inner sleeve within the outer sleeve, and a retainer bearing to retain the inner sleeve within the outer sleeve. The balancing assembly may include a threaded balancer block attached to a swing arm clamp, an unthreaded balancer block attached to a swing arm, a threaded rod extending through the threaded balancer block and through the unthreaded balancer block, a gripping head at one end of the threaded rod, a thrust bearing assembly sandwiching the unthreaded balancer block, and a locking collar fixed to the threaded rod adjacent the thrust bearing assembly and the unthreaded balancer block.

18 Claims, 16 Drawing Sheets

AUTOMOBILE ROTISSERIE

REFERENCE TO RELATED APPLICATIONS

This application claims priority from U.S. Provisional Patent Application Ser. No. 61/280,368 filed Nov. 2, 2009, the entire contents of which are hereby incorporated herein by reference.

FIELD OF THE INVENTION

The present invention relates generally to automobile rotisseries, and more particularly to an automobile rotisserie having improved stability and performance.

BACKGROUND TO THE INVENTION

Automobile rotisseries are used to hold an automobile or other large object above the ground in a manner in which the object can be rotated about its longitudinal axis. This allows a worker to access all areas of the object without having to go under it, and provides improved worker safety and comfort.

Prior art rotisseries have several known defects. For example, the various components are often not held in a rigid, perfectly aligned condition when loaded with heavy object such as an automobile. This is due to the tolerances or clearances between components in prior art rotisseries, which introduces some level of tilt when weight is applied to the rotisserie, and often leads to binding during rotation or when the object is being lowered. Poor connections and alignment also introduce more stress on the device, causing components to wear faster and become even more misaligned.

A need therefore exists for an improved rotisserie that holds heavy objects such as automobiles in a rigid, well aligned position. The present invention addresses that need.

SUMMARY OF THE INVENTION

Briefly describing one aspect of the present invention, there is provided an automobile rotisserie comprising:

a) a pair of vertical support columns;

b) a rotation assembly attached to each support column;

d) a swing arm clamp attached to each rotation assembly;

e) a swing arm slidably received in and clamped by each swing arm clamp;

f) a balancing assembly effective for controlling the movement and positioning of said swing arm within said swing arm clamp; and g) a mounting connection extending from each swing arm to facilitate connection to an object to be held by the rotisserie.

The rotation assembly may be attached to the vertical support columns by a neck clamp that allows the rotation assembly to be moved vertically with respect to the support column.

The neck clamp and/or the swing arm clamp may comprise an L-shaped outer clamp plate and a W-shaped inner clamp plate.

The support columns may include a base.

The two members of the pair of support columns may be connected by a connector.

The neck clamp may include an anti-binding bearing effective for maintaining the neck clamp in a slightly spaced apart relationship with respect to the vertical support column when the neck clamp is released from it's fully-clamped condition. This prevents binding of the neck clamp when the object is being lowered.

The rotation assembly may comprise:

a) a outer neck sleeve fixedly attached to said neck clamp;

b) an inner insert sleeve fixedly attached to said swing arm clamp, wherein said inner insert sleeve includes a groove effective for retaining bearings;

c) a plurality of bearings in said inner sleeve groove to facilitate rotational movement of said inner sleeve within said outer sleeve; and d) a retaining bearing to retain said inner sleeve within said outer sleeve.

The rotation assembly may additionally comprises a locking bolt to selectively prevent rotation of said inner sleeve within said outer sleeve.

The balancing assembly may comprise:

a) a threaded balancer block fixedly attached to said swing arm clamp;

b) an unthreaded balancer block fixedly attached to said swing arm;

c) a threaded rod extending through said threaded balancer block and through said unthreaded balancer block;

d) a gripping head at one end of said threaded rod;

e) a thrust bearing assembly sandwiching said unthreaded balancer block; and f) a locking collar fixed to said threaded rod adjacent said thrust bearing assembly and said unthreaded balancer block.

Each of the mounting arms may be clamped to said swing arm by a mounting arm clamp.

The mounting arm clamp may comprise an L-shaped outer clamp plate and a W-shaped inner clamp plate.

Additional features and advantages of the present invention are described in the description of preferred embodiments below.

DESCRIPTION OF THE PREFERRED EMBODIMENTS

Figure 1:
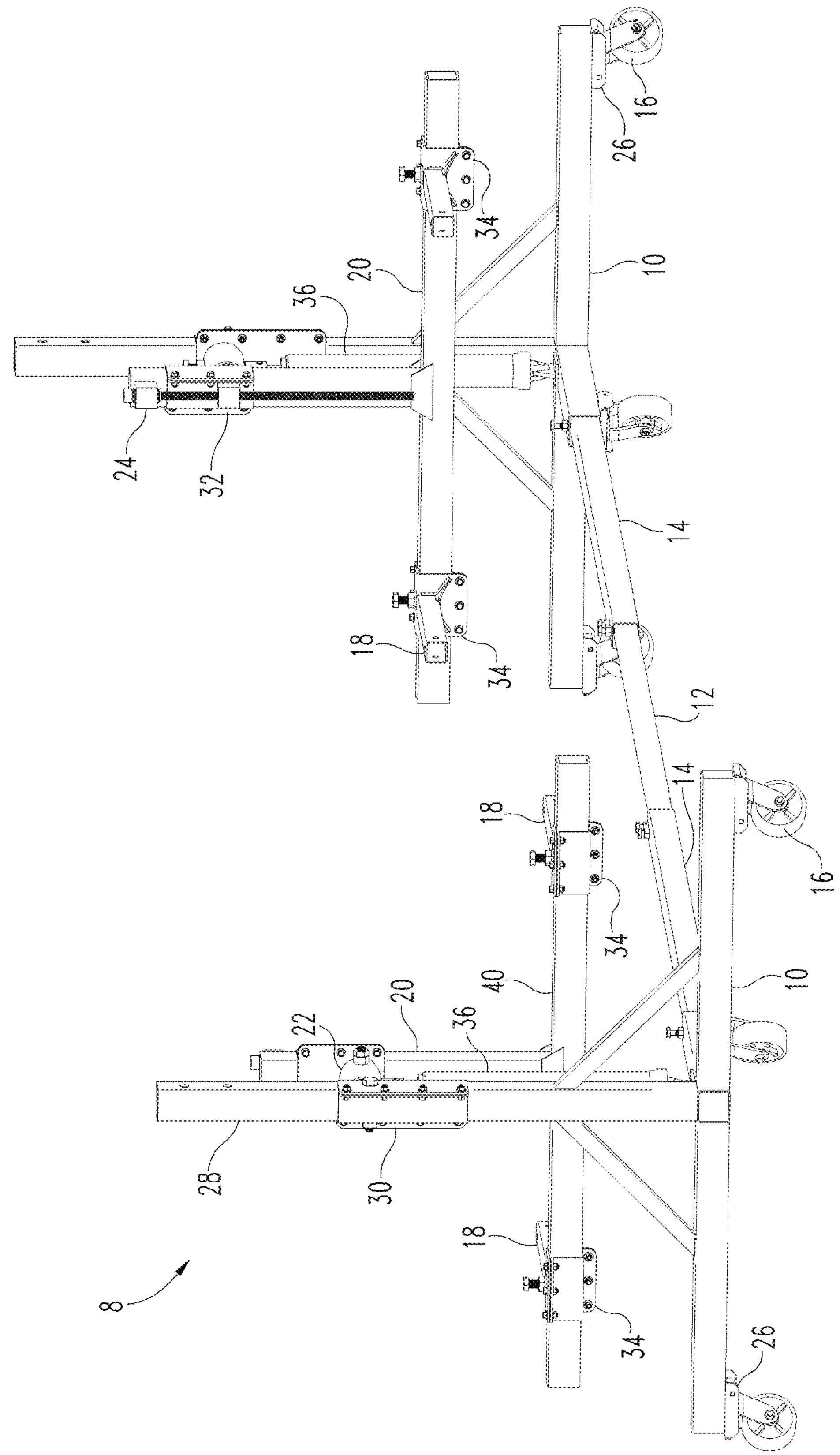
FIG. 1 is a perspective view of one preferred embodiment of the assembled rotisserie of the present invention.

For the purpose of promoting an understanding of the principles of the present invention, reference will now be made to certain preferred embodiments, and specific language will be used to describe the same. It will nevertheless be understood that no limitation of the scope of the invention is thereby intended. Any alterations and further modifications in the described embodiments and any further applications of the principles of the present invention as described herein are contemplated as would normally occur to one skilled in the art to which the invention relates.

As briefly described above, one aspect of the invention provides a rotisserie for holding a heavy object, such as an automobile, in a position up off the ground, such that the object may be rotated about its longitudinal axis. The preferred rotisserie comprises a pair of vertical support columns. Each vertical support column has a rotation assembly attached to it. Each rotation assembly is connected to a swing arms and associated hardware for holding an object and allowing it to rotate on the stand. Each swing arm is associated with a balancing assembly for balancing the object with respect to the axis of rotation of the rotisserie.

The vertical support columns are typically free-standing metal columns that may include a base for stability. The columns may be made of steel tubes, preferably with a rectangular cross-section. The columns are designed to support heavy loads in excess of 500 pounds each, and more commonly in excess of 1000 pounds each. In particular, each support column is designed to hold one end of an object such as an automobile or a truck as the object is raised from the ground.

In the more preferred embodiments each vertical support column includes a mechanism, such as a clamp, for holding the associated rotation assembly in a selected location on the support column. In the preferred embodiments this mechanism is a neck clamp that comprises an L-shaped outer plate and a W-shaped inner plate that is bolted to the outer plate in two directions. The L-shaped plate/W-shaped plate clamp combination provides superior contact with the vertical support column by ensuring that the inner surfaces of the L-shaped plate and the W-shaped plate maintain full contact with the support column even under heavy loads. This prevents the clamp, and more importantly the rotation assembly, from moving out of vertical alignment with the column.

In the most preferred embodiments the neck clamp also includes an anti-binding bearing effective for maintaining the neck clamp in a spaced apart relationship with respect to the vertical support column when the neck clamp is released from it's fully-clamped condition. This prevents the leading, lower edge of the clamp plate from digging the support column as the clamp is lowered.

As indicated above, a rotation assembly is attached to each support column. The rotation assemblies comprise an inner tube and an outer tube, with the inner tube rotating inside the outer tube to allow rotation of the object being held by the rotisserie. Accordingly, one end of the rotation assembly is attached to the support column and the other end of the rotation assembly is attached to a swing arm that rotates (or "swings") as the rotation assembly rotates.

In the most preferred embodiments the outer sleeve of the rotation assembly is fixedly attached to the neck clamp that is connected to the support column. The inner insert sleeve of the rotation assembly is fixedly attached to a swing arm clamp that holds the swing arm. A plurality of ball bearings between the outer sleeve and the inner sleeve to facilitate rotational movement of the inner sleeve within the outer sleeve.

The plurality of bearings is preferably provided in two grooves in the inner sleeve to keep the inner and outer sleeves completely aligned with respect to each other under load. A retainer bearing is provided in another groove to retain the inner sleeve within the outer sleeve. A set screw or a locking bolt to selectively prevent rotation of said inner sleeve within said outer sleeve may also be included.

The swing arm assembly preferably includes a swing arm clamp fixedly attached to the rotation assembly as described above. A swing arm is slidably received in and clamped by the swing arm clamp. In the preferred embodiments the swing arm clamp comprises an L-shaped outer plate and a W-shaped inner plate that is bolted to the outer plate in two directions. The L-shaped plate/W-shaped plate clamp combination provides superior contact with the swing arm by ensuring that the inner surfaces of the L-shaped plate and the W-shaped plate maintain full contact with the swing arm under heavy loads. This prevents the clamp, and more importantly the swing arm, from moving out of proper vertical alignment.

A T-shaped swing arm is preferably used. The T-shaped swing arm includes a vertical member that moves up and down with respect to the rotation assembly to allow proper vertical balancing of the object being held by the rotisserie, and a horizontal member that allows horizontal adjustment of the object being held by the rotisserie.

One or more mounting arms may be provided on the swing arm to facilitate attachment of an object to the rotisserie. The mounting arms may be attached with a clamp such as the "W-L" clamp preferably used for other connections.

The swing arm is balanced with respect to the rotation assembly so that the center of gravity of the object being held is on or very near the axis of rotation of the rotation assembly. Accordingly, the balancing assembly raises or lowers the object being held so that the longitudinal axis of the object is along the axis of rotation of the rotisserie.

The balancing assembly preferably includes a threaded balancer block fixedly attached to the swing arm clamp, an unthreaded balancer block fixedly attached to the swing arm, a threaded rod extending through the threaded balancer block and through the unthreaded balancer block, a gripping portion effective for turning said threaded rod, a thrust bearing assembly sandwiching said unthreaded balancer block, and a locking collar fixed to said threaded rod adjacent said thrust bearing assembly and said unthreaded balancer block. The unthreaded balancer block is preferably attached to the face of the swing arm nearest the object being supported by the rotisserie, and the threaded balancing block is preferably attached to the face of the swing arm clamp nearest the object being supported by the rotisserie. With this construction the threaded balancing block is vertically aligned with the unthreaded balancer block.

More particularly describing the balancing assembly, the upper end of the swing arm may be provided with an unthreaded balancer block sized to receive a threaded rod. A threaded rod passes though the balancer block, and is free to rotate with in the block. Immediately above and below the balancer block are a pair of bearings, referred to herein as thrust bearings. Immediately adjacent the thrust bearings are two locking collars that grip and lock to the threaded rod. Most preferably, one of the locking collars is also a gripping member that allows the user to grip and rotate the rod when the rotisserie is loaded with a heavy load. The two locking collars hold the threaded rod securely in the unthreaded balancer block, and additionally hold the thrust bearings tightly above and below the balancer block. When held in this compact assembly, the thrust bearings allow the locking collars to rotate with respect to the balancer block.

The threaded balancer block is provided in the swing arm clamp below and vertically aligned with the unthreaded balancer block. The threaded rod passes through the threaded balancer block such that the rod moves up or down as the rod is turned. This moves the end of the threaded rod held by the unthreaded balancer block up or down relative to the swing arm clamp. Accordingly, by turning the threaded rod the user may move the swing arm up or down relative to the rotation assembly. This enables the user to move vertically the object being held by the rotisserie, and thus to balance the object with respect to the axis of rotation of the rotisserie.

In one preferred embodiment the automobile rotisserie, comprises:

a) a pair of rectangular, vertical support columns;
b) a neck clamp clamped to each vertical support column;
c) a rotation assembly fixedly attached to each neck clamp;
d) a swing arm clamp fixedly attached to each rotation assembly;
e) a swing arm slidably received in and clamped by each swing arm clamp;
f) a balancing assembly effective for controlling the movement and positioning of said swing arm relative to said swing arm clamp; and
g) a mounting assembly extending from each swing arm;

wherein at least one of said neck clamp and said swing arm clamp comprises an L-shaped outer clamp plate and a W-shaped inner clamp plate; and wherein said balancing assembly comprises:

i) a threaded balancer block fixedly attached to said swing arm clamp;
ii) an unthreaded balancer block fixedly attached to said swing arm;
iii) a threaded rod extending through said threaded balancer block and through said unthreaded balancer block;
iv) a gripping portion effective for turning said threaded rod;
v) a thrust bearing assembly sandwiching said unthreaded balancer block; and
vi) a locking collar fixed to said threaded rod adjacent said thrust bearing assembly and said unthreaded balancer block; and wherein said rotation assembly comprises:

i) an outer neck sleeve fixedly attached to said neck clamp;
ii) an inner insert sleeve fixedly attached to said swing arm clamp;
iii) a plurality of ball bearings between said outer sleeve and said inner sleeve to facilitate rotational movement of said inner sleeve within said outer sleeve; and
iv) a retainer bearing to retain said inner sleeve within said outer sleeve.

As with other embodiments, the unthreaded balancer block may be attached to the face of the swing arm nearest the object being supported by the rotisserie, and the threaded balancing block may be attached to the face of the swing arm clamp nearest the object being supported by the rotisserie, so that the threaded balancing block is vertically aligned with the unthreaded balancer block.

It is to be appreciated that the rotisserie of the present invention has improved connections and alignment when compared to the rotisseries of the prior art. The inventive rotisserie construction removes substantially all of the gaps between moving components and keeps all of the connections tight. Further, the inventive design removes substantially all of the drag at the pivot and on the outer upright posts by using bearings to reduce the drag.

Referring now to the drawings, FIG. 1 is a perspective view of the assembled rotisserie 8 in a mobile configuration with caster wheels 16 mounted to each base unit 10 with quick release caster pads 26. The swing arm 20 rotates about an axis via the rotating assembly 22. The rotating assembly 22 is attached to the upright column 28 of the rotisserie base by an adjustable clearance clamp system 30 (also referred to as a "neck" clamp by virtue of its location at the front end of the rotisserie. Swing arm 20 is adjustable perpendicular to the axis of rotation assembly 22 by means of balancing assembly 32. Mounting arms 18 are attached to swing arm 20 by way of an adjustable clearance clamp system with a redundant locking bolt. Mounting arms 18 may be positioned at any point necessary along the horizontal member 40 of swing arm 20. This allows adjustment of the width of the mounting locations, and allows the object to be balanced horizontally with respect to the axis of rotation. Single acting hydraulic cylinders 36 provide height adjustment of rotation assembly 22. A series of telescoping tubes 12, 14 extend between the rotisserie bases 10 to provide adjustment of working room between the rotisserie ends.

Figure 2:
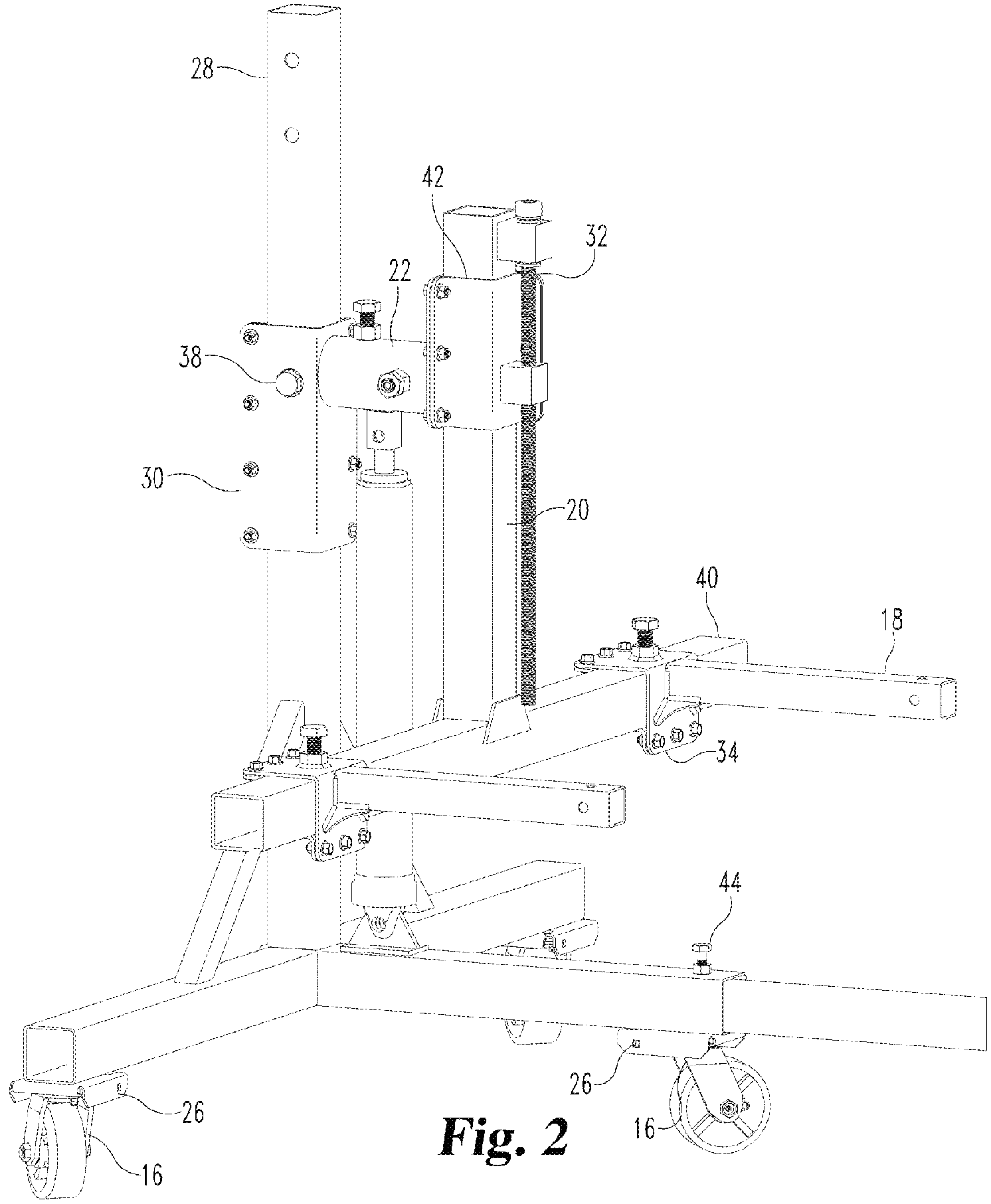
FIG. 2 is a perspective view of one end of the rotisserie of the present invention, according to one preferred embodiment.

FIG. 2 shows one embodiment of the rotisserie end unit in more detail. Hydraulic cylinder 36 is lowered and neck clamp 30 is positioned in its lowest position in this configuration and secured by a fastener 38 which passes through upright column 28 and the opposite clamping plate. Swing arm 20 is also shown in a lowered position. It may be secured by the balancing assembly 32 which retains the swing arm in any position along the extent of travel through the swing arm clamp 42. The fastener 44 which locks the telescoping tubes 12, 14 to the rotisserie base is shown as well.

Figure 3:
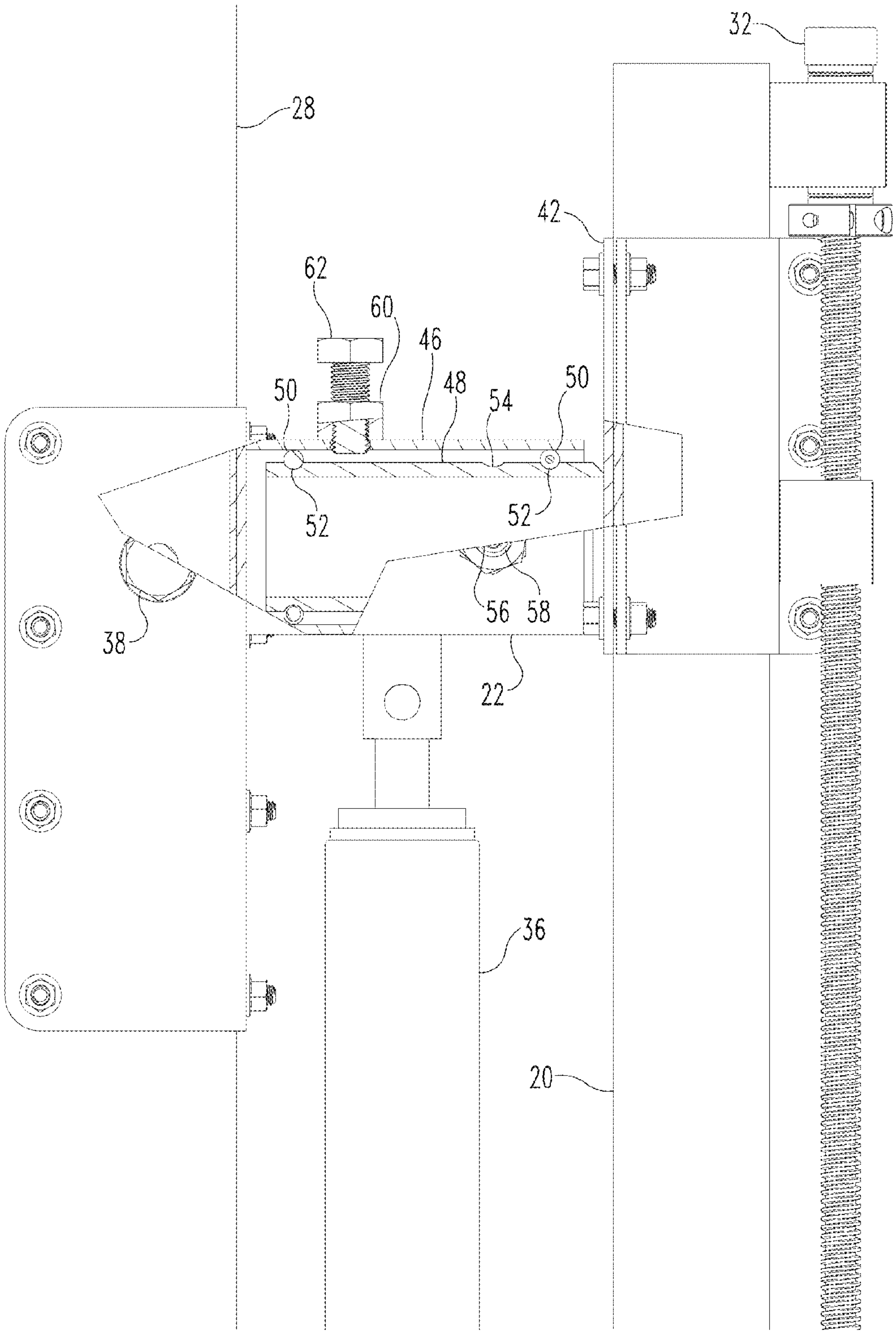
FIG. 3 is a side view, in partial section, of the rotation assembly of the rotisserie of the present invention, according to one preferred embodiment.

FIG. 3 is a cutaway view of rotation assembly 22. Outer neck sleeve 46 is secured to neck clamp plate 30 by solidly welding around the circumference of the junction. Inner insert sleeve 48 is secured to the swing arm clamp plate 42 by solidly welding around the circumference of the junction. Ball bearings 50 are retained directly within the rotation assembly 22 by means of mating groves 52 machined circumferentially about insert sleeve 48 which eliminates the need for a separate bearing race. A number of bearing balls 50 sufficient to wrap the circumference of the insert 48 are placed about mating groves 52 of the insert with or without a cage assembly. An additional bearing ball 56 or set of balls rides within the mating groove 54 which is machined circumferentially about the insert 48 and retains the insert and ball assembly within the neck sleeve 46. Retaining ball 56 is held in place by a fastener with a concave point 58 such as a cup point set screw. A nut 60 is fastened to the neck sleeve 46 which secures a locking bolt 62. Locking bolt 62 places tension on the insert 48 and thereby preventing the rotating assembly from rotating. This allows the user to lock the rotisserie at any desired position within the rotation. Hydraulic cylinder 36, which provides adjustment of working height, is fastened to the neck sleeve 46.

Figure 4:
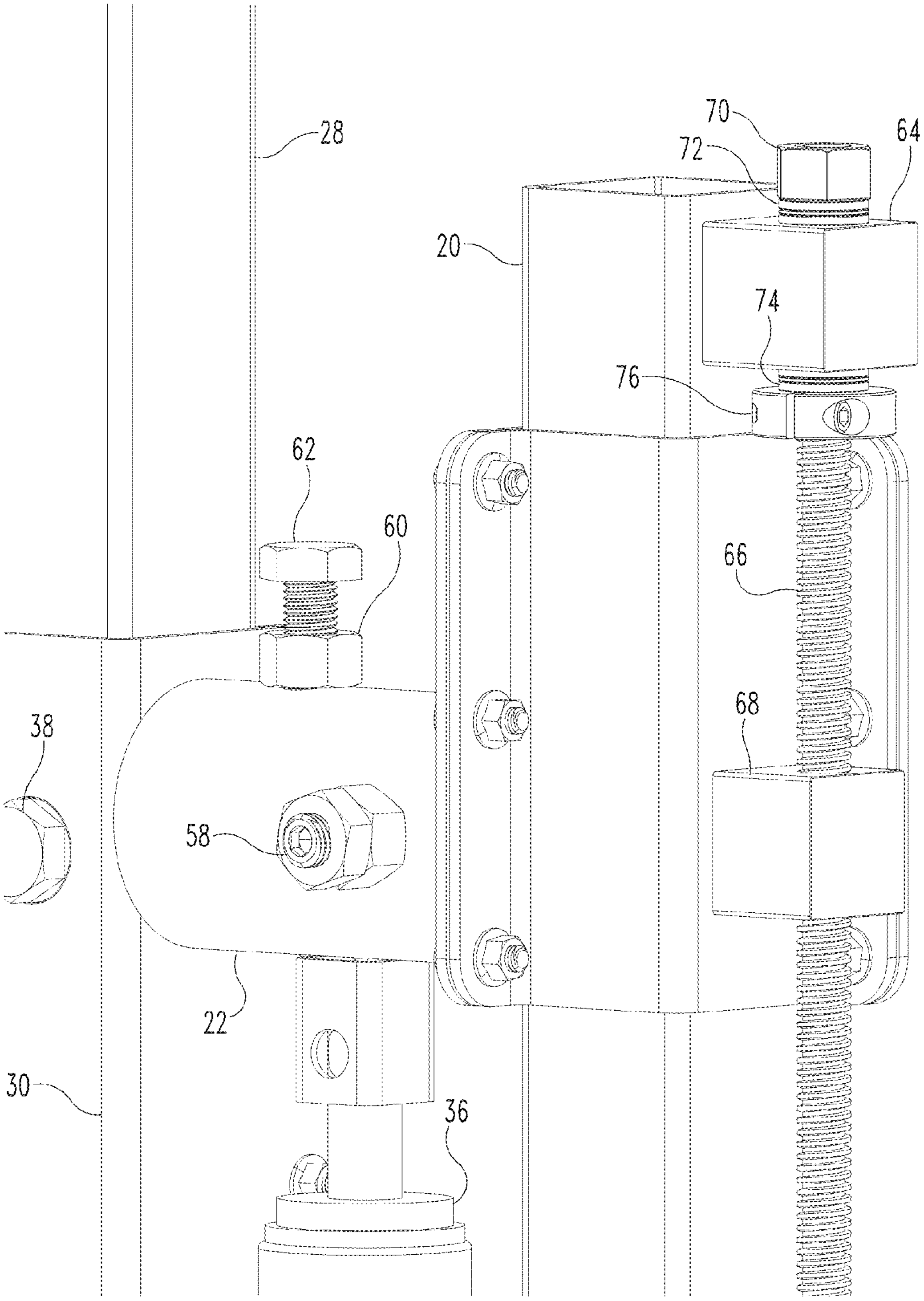
FIG. 4 is a perspective view of the balancing assembly of the rotisserie of the present invention, according to one preferred embodiment.

FIG. 4 is a perspective detail of the balancing assembly 32. A solid balancer block 64 with a single smooth hole bored therethrough is fastened to swing arm 20. Through this smooth bore hole in balancer block 64 passes a threaded rod 66 which screws into a solid block with a single appropriately threaded hole 68. A nut 70 is fastened to one end of the threaded rod 66. Between the nut 70 and the smooth bore balancer block 64 is a thrust bearing assembly 72. An additional thrust bearing assembly 74 is placed on the opposite side of the smooth bore balancer block 64. Finally, a threaded clamp on shaft collar 76 is secured to the threaded rod with the play taken out of the thrust bearing assemblies 72, 74 adjacent to the smooth bore balancer block 64.

In operation, a device such as a wrench is used to turn threaded rod 66 via the fastened nut 70. In doing so, it causes the swing arm 20 to move along a plane perpendicular to the rotation of the rotisserie. When the load is at the desired location the design of the balancing assembly prohibits any further movement without manually turning the threaded rod.

Figure 5:
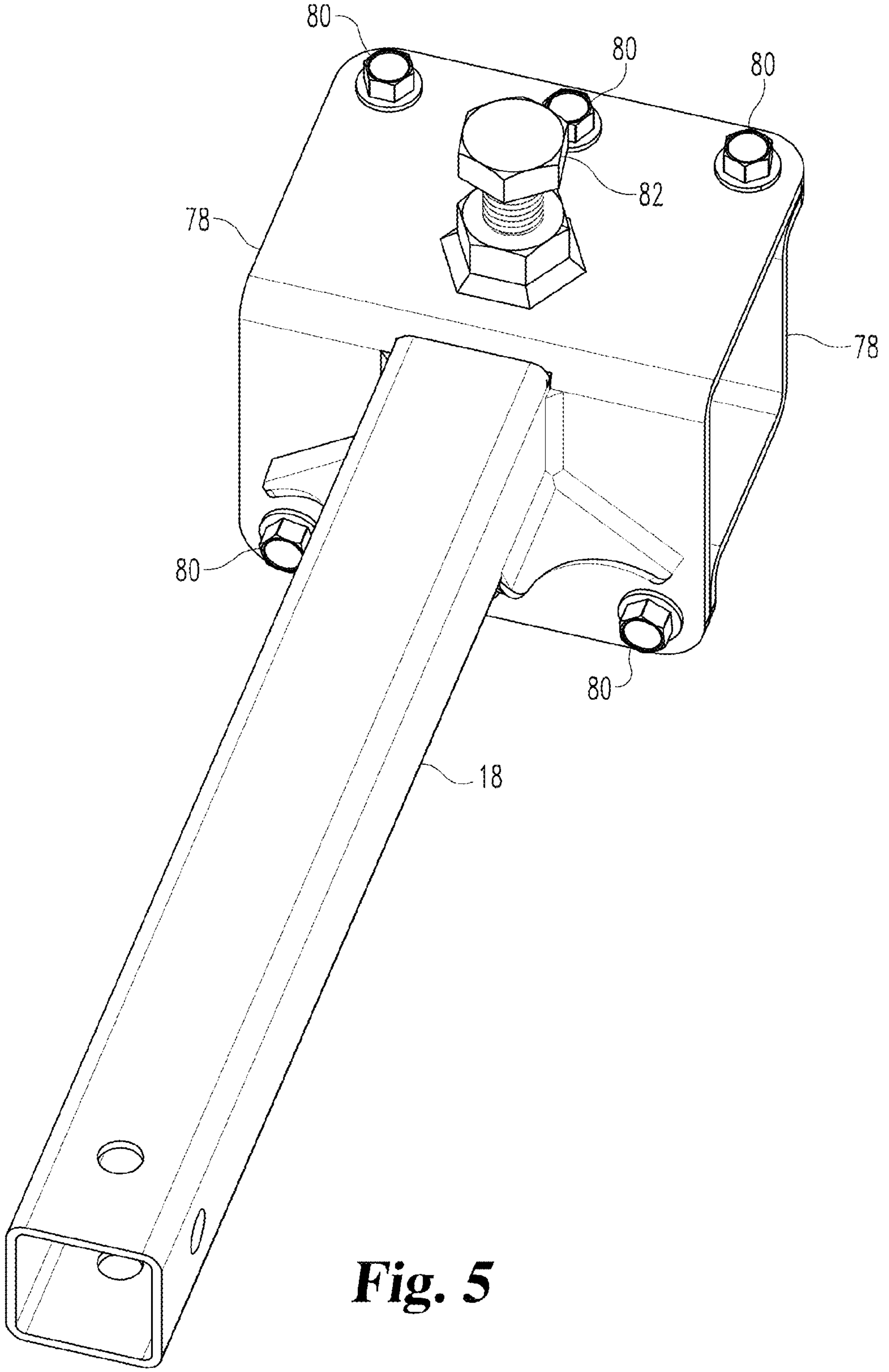
FIG. 5 is a perspective view of a mounting arm assembly of the rotisserie of the present invention, according to one preferred embodiment.

FIG. 5 is a perspective detail of an individual mounting arm 18. A load, such as a vehicle body or other piece of equipment, is mounted to the rotisserie by securely fastening it to the mounting arms 18. Mounting arm 18 attaches to the horizontal member 40 of swing arm 20 with adjustable clearance clamping plates 78. The clamping force of the clamping plates is adjusted by tightening or loosening the series of fasteners 80 along each edge. Mounting arm clamps 78 feature additional locking bolts 82 which press directly to the horizontal member of the swing arm 40 to provide double securement of the mounted load.

Figure 6A:
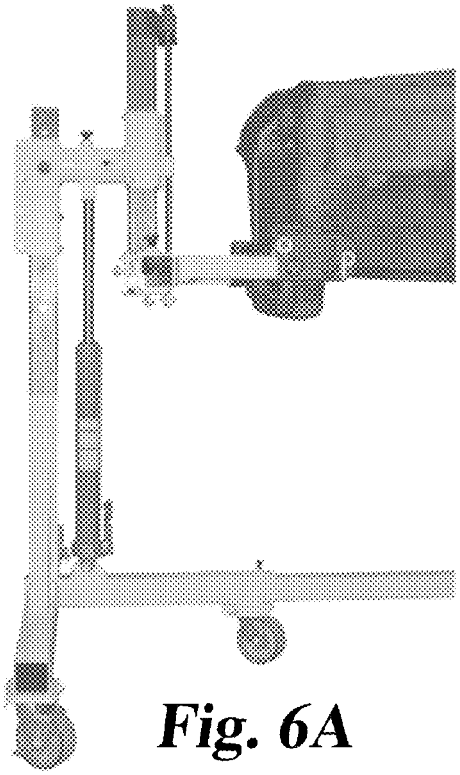
FIGS. 6A and 6B show an automobile held and rotated by one preferred embodiment of the assembled rotisserie of the present invention.
Figure 6B:
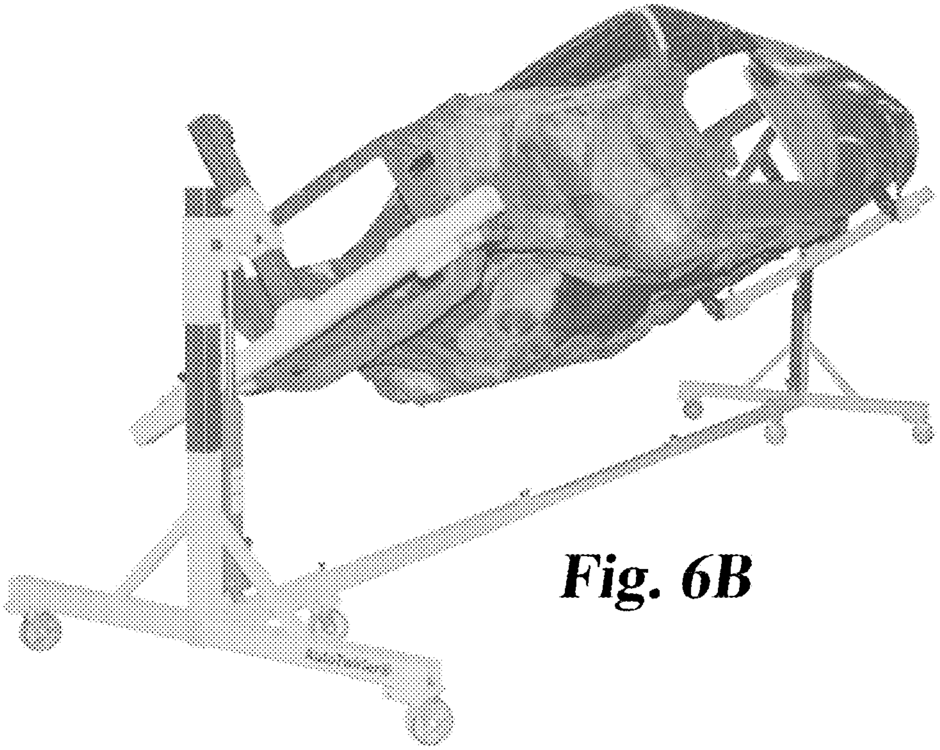

FIGS. 6A and 6B show an automobile held and rotated by one preferred embodiment of the assembled rotisserie of the present invention.

Figure 7:
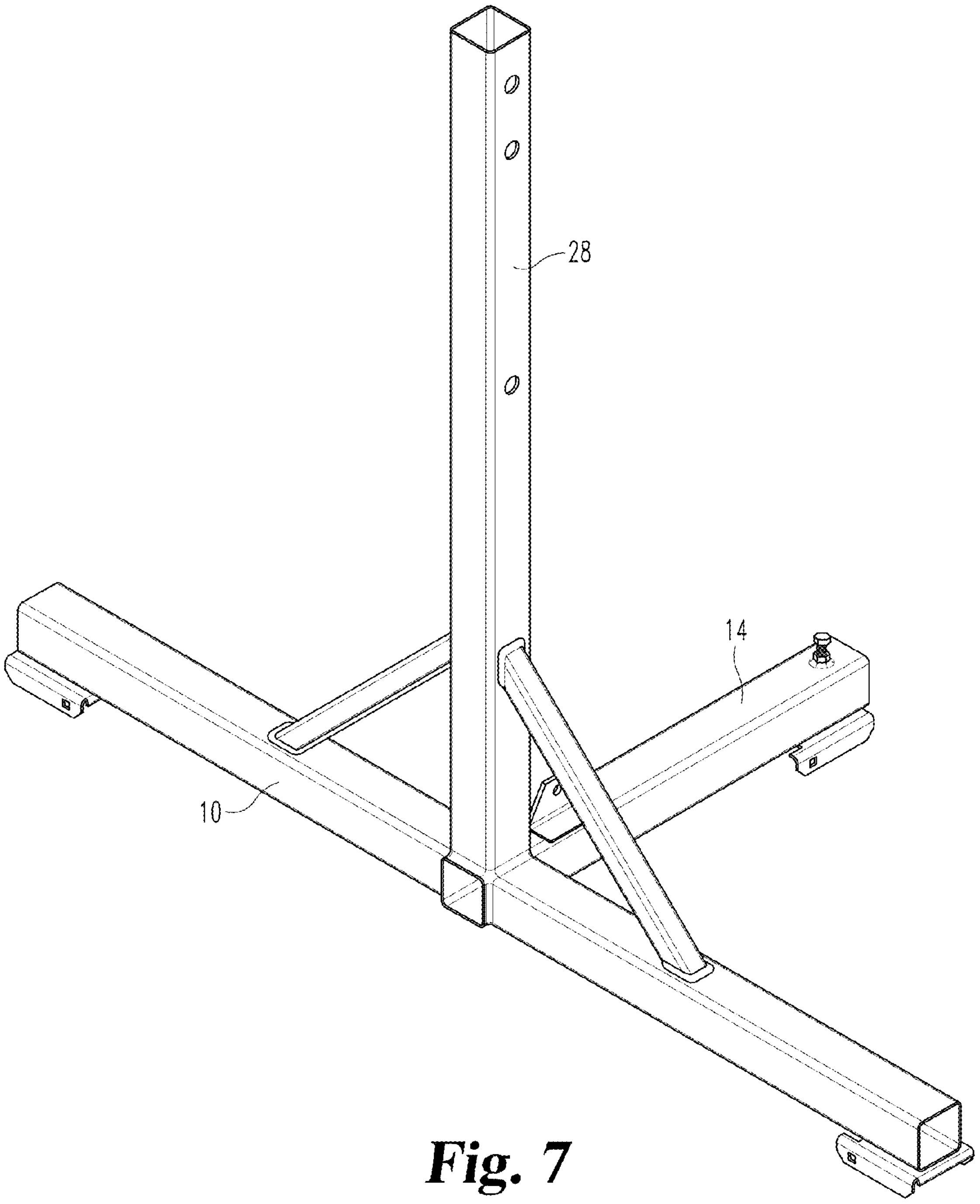
FIG. 7 is a perspective view of a vertical support column and associated base, according to one preferred embodiment of the present invention.

FIG. 7 is a perspective view of a vertical support column and associated base, according to one preferred embodiment of the present invention. Vertical support column 28 is kept stable by a base 10, and optionally by a telescoping tube 14 that extends to connect to another rotisserie end unit.

Figure 8A:
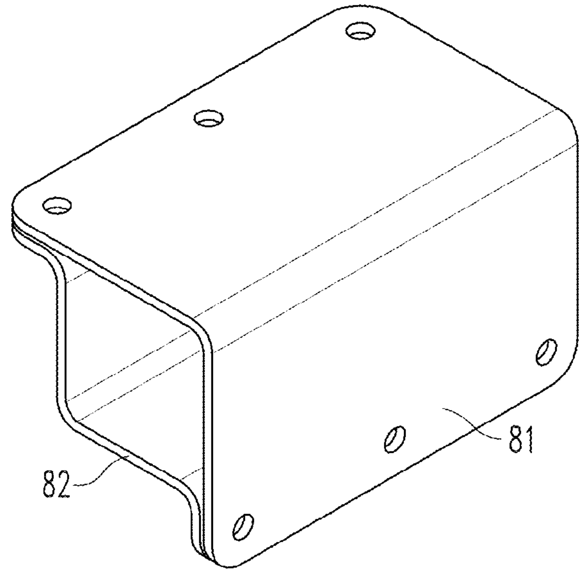
FIGS. 8A and 8B are perspective views of "W-L" clamping members, according to preferred embodiments of the present invention.
Figure 8B:
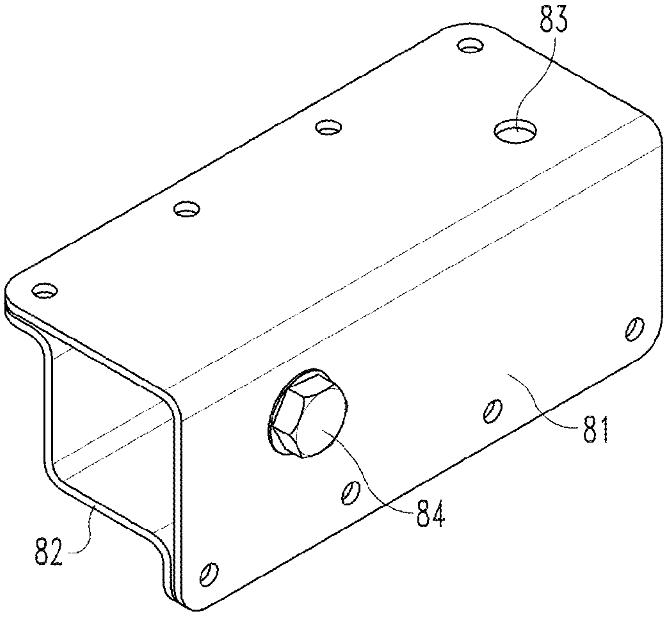

FIGS. 8A and 8B are perspective views of "W-L" clamping members, according to preferred embodiments of the present invention. Outer plate 81 is L-shaped, while inner plate 82 is W-shaped. With this configuration the two plates cooperate to clamp tightly to the vertical support or swing arm, and hold the surfaces tight against each other. Moreover, the bolts holding the two plates together are tightened in two directions, which are perpendicular to each other in the illustrated clamp. Note that FIG. 8B shows an aperture 84 for providing an anti-binding bearing that may be held in place by a set screw. FIG. 8B also shows a fastener 38 which can pass through the support column and the opposite clamping plate.

Figure 9:
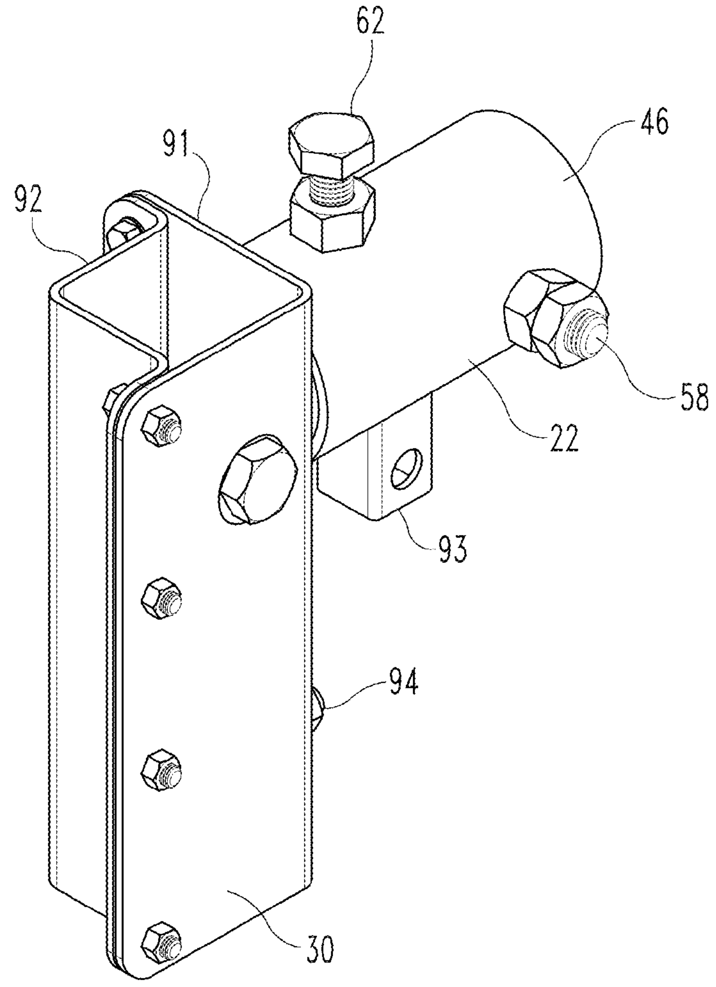
FIG. 9 is a perspective view of a neck clamp and the outer sleeve of a rotation assembly, according to one preferred embodiment of the present invention.

FIG. 9 is a perspective view of a neck clamp and the outer sleeve of a rotation assembly, according to one preferred embodiment of the present invention. Neck clamp 30 includes L-shaped plate 91 and W-shaped plate 92. Rotation assembly 22 extends from neck clamp 30, and includes outer sleeve 46. Locking bolt 62 and fastener 58 with a concave point to hold a retained bearing (not shown) are also included. Jack mount 93 is provided to facilitate movement of the rotisserie with a hydraulic jack. Set screw 94 holds an anti-binding bearing effective for maintaining the neck clamp in a spaced apart relationship with respect to said vertical support column when the neck clamp is released from it's fully-clamped condition. The anti-binding bearing keeps the clamp (or collar) on the outside post from digging into the post when pressure is released from the jack to lower the car. The anti-binding bearing ensures and maintains a small gap between the clamp/collar and the support post to allow for movement of the collar along the post. Since a small gap will naturally exist when the neck clamp is loosened from its tightened condition, the weight of the automobile (or other heavy object) will cause the neck collar to tilt forward slightly when the collar is loosened. The anti-binding bearing keeps the clamp away from the post just enough to keep it from binding up when the object is being lowered.

Figure 10:
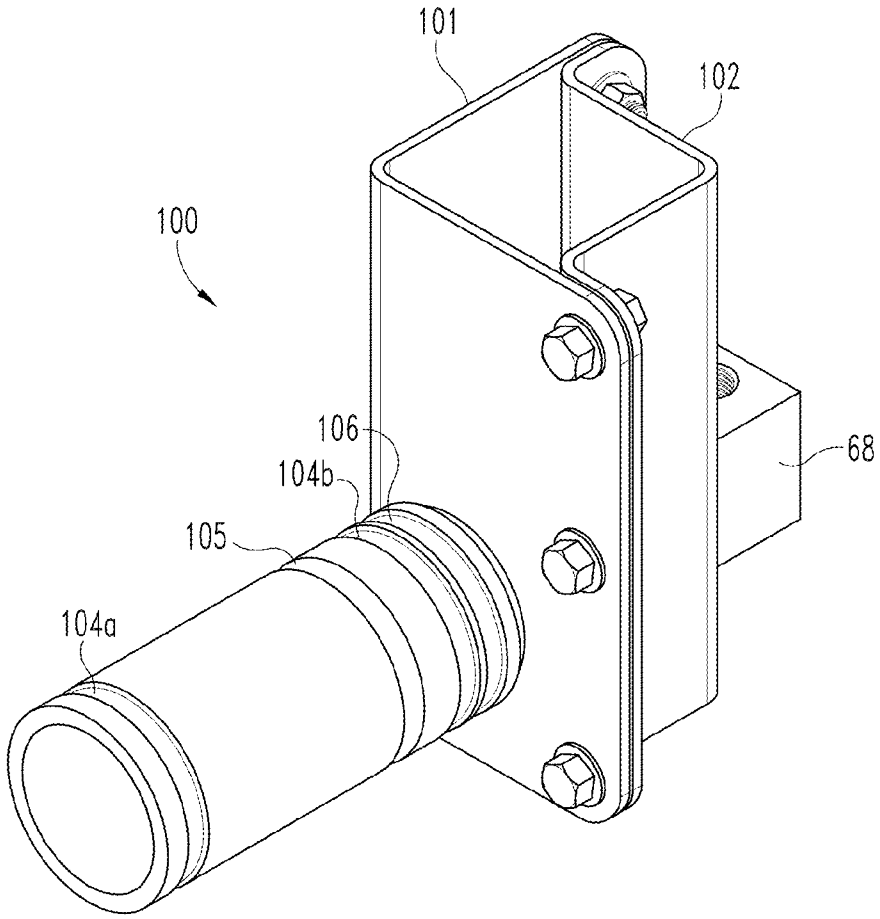
FIG. 10 is a perspective view of a swing arm clamp and the inner sleeve of a rotation assembly, according to one preferred embodiment of the present invention.

FIG. 10 is a perspective view of a swing arm clamp and the inner sleeve of a rotation assembly, according to one preferred embodiment of the present invention. Swing arm clamp 100 includes L-shaped outer plate 101 and W-shaped inner plate 102. Inner sleeve 103 includes a pair of grooves 104*a* and 104*b* for receiving and retaining bearings that facilitate rotational movement of the inner sleeve within the outer sleeve. Groove 105 receives and retains a retainer bearing that retains the inner sleeve within the outer sleeve. Groove 106 receives and retains an O-ring that may be used to seal the interior of the rotation assembly from fouling.

Figure 11:
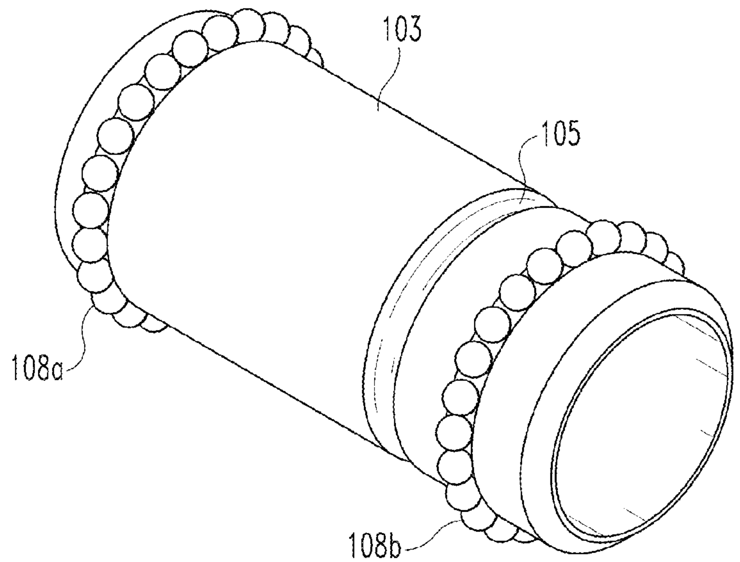
FIG. 11 is a perspective view of an inner sleeve and associated bearings of a rotation assembly, according to one preferred embodiment of the present invention.

FIG. 11 is a perspective view of an inner sleeve and associated bearings of a rotation assembly, according to one preferred embodiment of the present invention. Inner sleeve 103 includes a pair of grooves with bearing sets 108*a* and 108*b* received therein to facilitate rotational movement of the inner sleeve within the outer sleeve. Groove 105 is provided to receive and retain a retainer bearing that retains the inner sleeve within the outer sleeve. In this Figure groove 106 that receives and retains an O-ring to seal the interior of the rotation assembly from fouling is not illustrated.

Figure 12:
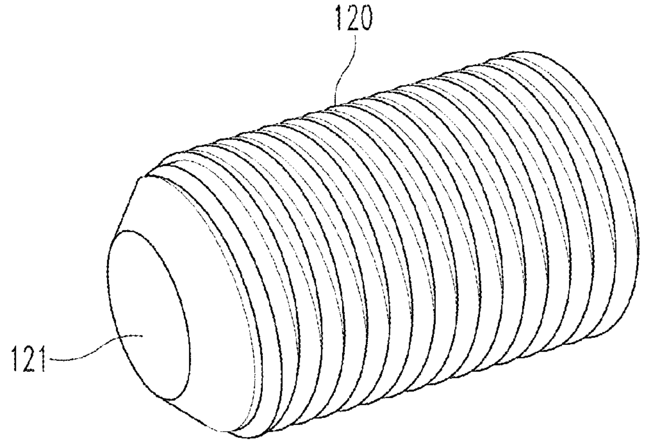
FIG. 12 is a perspective view of a set screw for holding a retaining bearing, according to one preferred embodiment of the present invention.

FIG. 12 is a perspective view of a set screw for holding a retaining bearing, according to one preferred embodiment of the present invention. Set screw 120 includes a concave end 121 that may hold a bearing in place.

Figure 13:
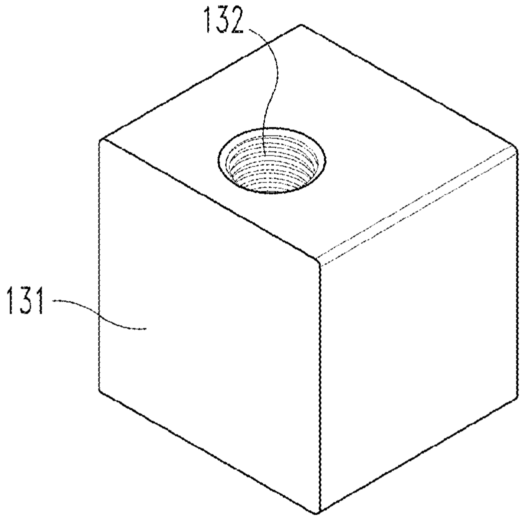
FIG. 13 is a perspective view of a threaded balancing block, according to one preferred embodiment of the present invention.

FIG. 13 is a perspective view of a threaded balancing block, according to one preferred embodiment of the present invention. Threaded balancing block 131 includes a threaded aperture 132 that is threaded to mate with the threads of the threaded rod of the balancing assembly.

Figure 14:
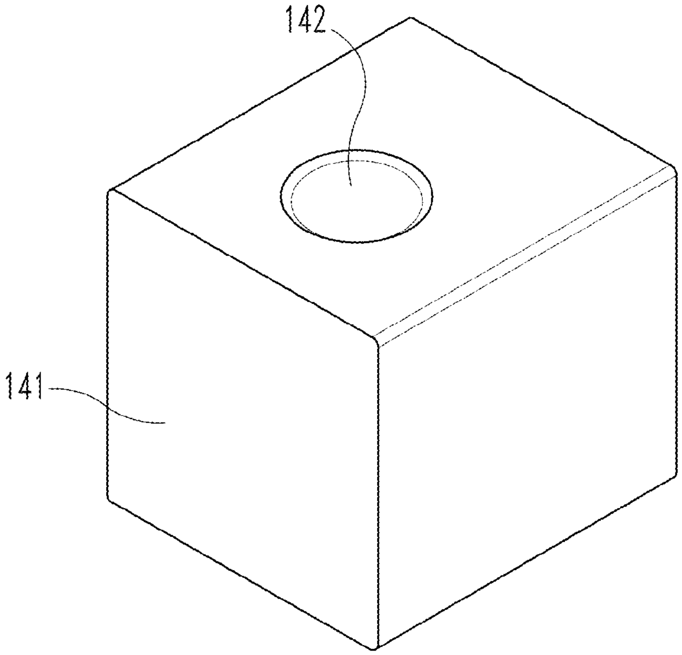
FIG. 14 is a perspective view of an unthreaded balancing block, according to one preferred embodiment of the present invention.

FIG. 14 is a perspective view of an unthreaded balancing block, according to one preferred embodiment of the present invention. Unthreaded balancing block 141 includes an unthreaded aperture 142 that is sized to allow passage therethrough of the threaded rod of the balancing assembly.

Figure 15:
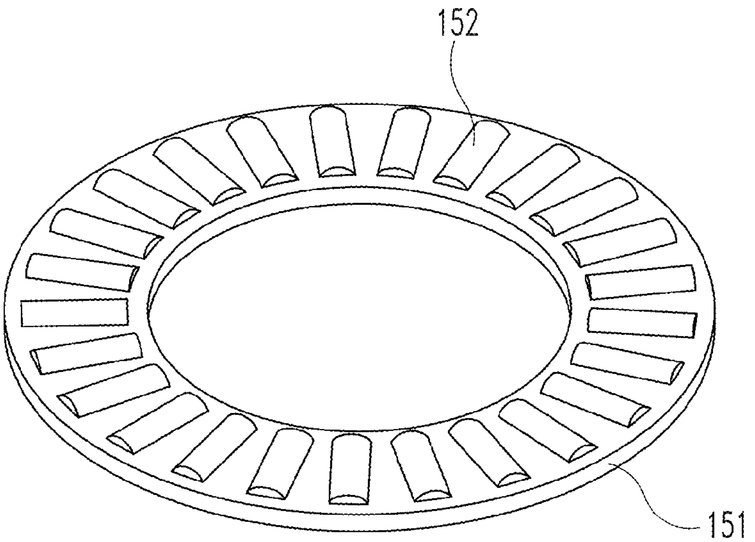
FIG. 15 is a perspective view of a thrust bearing from a thrust bearing assembly, according to one preferred embodiment of the present invention.

FIG. 15 is a perspective view of a thrust bearing from a thrust bearing assembly, according to one preferred embodiment of the present invention. Thrust bearing assembly 151 includes a set of roller bearings that allow surfaces above and below the thrust bearing to rotate with respect to each other without binding.

Figure 16:
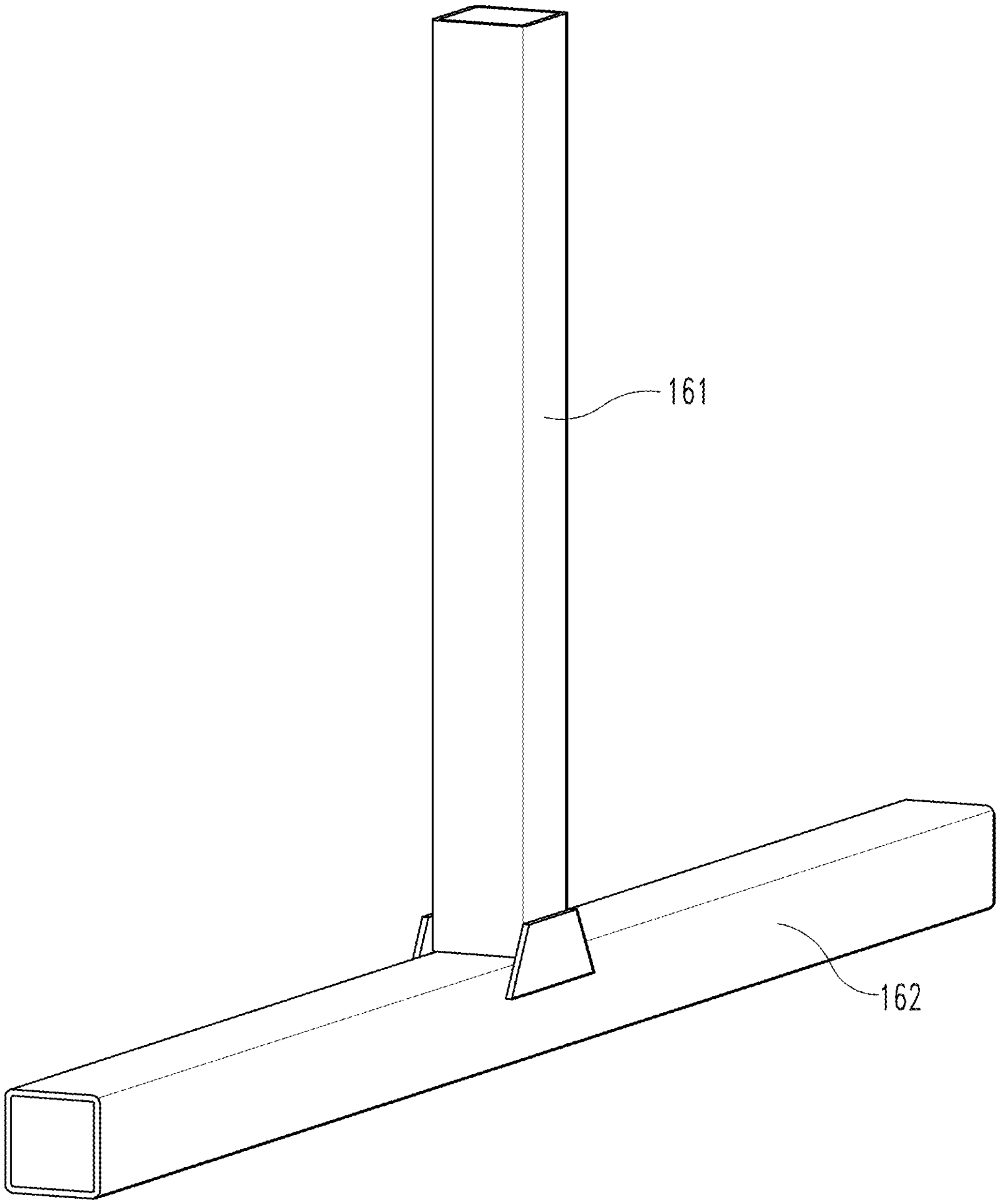
FIG. 16 is a perspective view of a swing arm, according to one preferred embodiment of the present invention.

FIG. 16 is a perspective view of a swing arm, according to one preferred embodiment of the present invention. Vertical swing arm member 161 supports horizontal swing arm member 162, which may be used to support mounting assemblies as described herein.

Figure 17:
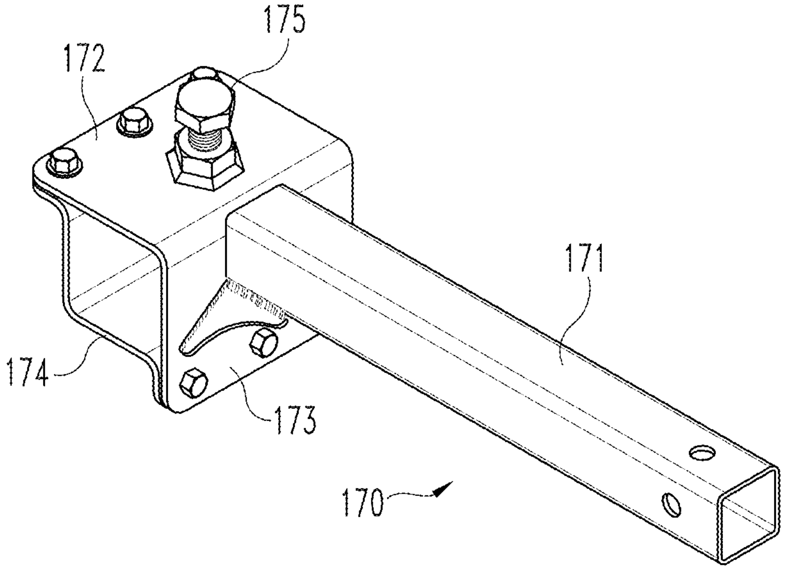
FIG. 17 is a perspective view of a mounting arm, according to one preferred embodiment of the present invention.

FIG. 17 is a perspective view of a mounting arm assembly, according to one preferred embodiment of the present invention. Mounting arm assembly 170 includes mounting arm 171 and mounting arm clamp 172. Mounting clamp 172 is a "W-L" clamping member, with an outer plate 173 that is L-shaped, and an inner plate 174 that is W-shaped. Locking bolt 175 is also illustrated.

Figure 18:
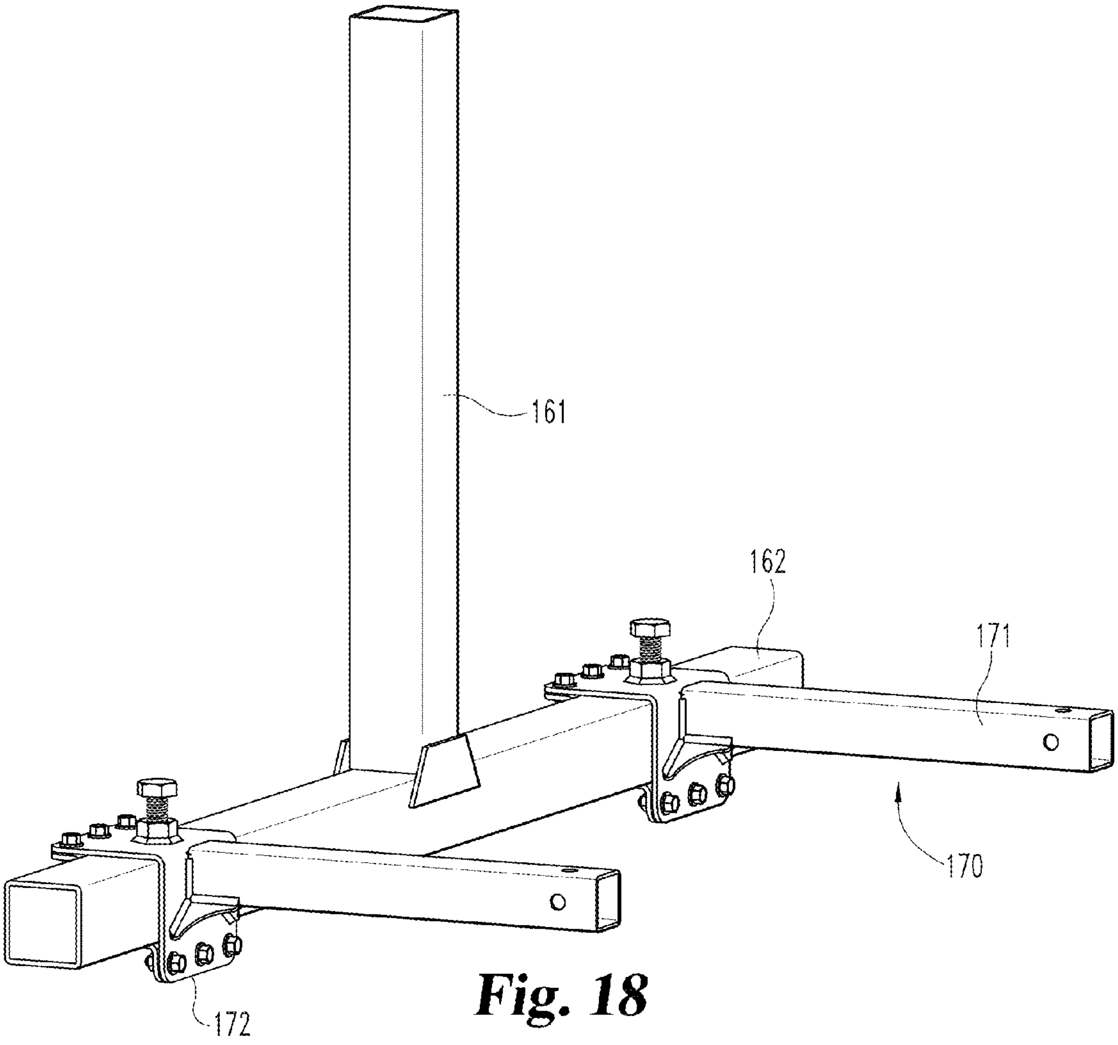
FIG. 18 is a perspective view of a swing arm and associated mounting arm, according to one preferred embodiment of the present invention.

FIG. 18 is a perspective view of a swing arm and associated mounting arm, according to one preferred embodiment of the present invention. Vertical swing arm member 161 supports horizontal swing arm member 162, that supports mounting arm assemblies 170. As previously illustrated, mounting arm assemblies 170 include mounting arm 171 and mounting arm clamp 172.

The operation of the rotisserie will now be described below using a vehicle body as the object being held. It is to be understood, however, that the basic operational characteristics of the device are substantially the same regardless of what type of load or item is attached to the rotisserie.

To properly attach a load to the rotisserie, it is preferable to ensure that the swing arm 20 is at its lowest position, as shown in FIG. 2. This is recommended because it ensures that a mounted load will always remain in a stable, or bottom heavy, position and will not rotate unintentionally until properly balanced.

The user may then attach each end of the rotisserie to the vehicle body by securely fastening to the mounting arms 18 at appropriate locations on the vehicle body, as illustrated in FIGS. 2 and 6A. After securely attaching each end of the rotisserie to the load at the mounting arm locations 18, the telescoping connector tubes (FIG. 1) 12, 14 are placed between the rotisserie ends and secured in place. The telescoping center tubes 12, 14 maintain proper position of the rotisserie ends to prevent possible misalignment and binding of the load. The next step is to remove the locking bolt (FIG. 2) 38 from the neck clamps 30 of both ends of the rotisserie and raise the rotating assemblies with the hydraulic cylinders 36 to a point where the locking bolts may be replaced in one of the upper retaining holes of the upright column 28. After the neck clamps 30 are properly secured the load may be balanced. Adjust the balance by turning the nut (FIG. 4) 70 which will raise the swing arm 20 in relation to the pivot point 22. Raise the swing arm 20 an equal distance on each end of the rotisserie until the weight of the load is properly distributed and rotates freely about the pivot point 22. See FIG. 6B photographic reference. The locking bolt may be engaged (FIG. 4) 62 to lock on the insert (FIG. 3) 48 which will fix the mounted object at any angle about the rotational axis.

In one alternative embodiment the balancing assembly 64, 66, 68, 70, 72, 74, 76 may be housed within the upright post of the swing arm 20. This prevents possible contamination of the threads and affords a sleeker design.

The rotisserie of the present invention is preferably constructed primarily of mild and carbon steel. Other materials with suitable strength characteristics may also be used. For example, alternative embodiments may be constructed of other metals, ferrous and non-ferrous, such as aluminum, titanium or stainless steel. Additionally, the rotisserie may be constructed from non-metals such as reinforced fiberglass or laminated carbon fiber when such materials meet the requirements of a specific application. Surface treatment options may be commonly available coatings such as paints, powder coating and zinc plating.

The cross section of most material used to construct the base and swing arm of this embodiment is square or rectangular structural steel tubing. In an alternative embodiment the components may be constructed from round or oval section material with modified mounting clamps to fit the revised sections.

Any number of locking bolts (FIG. 4) 62 may be placed on the pivot point to provide additional load securement. As well, additional retaining balls (FIG. 3) 56, 58 may be utilized to provide enhanced securement of the pivoting assembly.

The hydraulic cylinders (FIG. 1) 20 are single acting, manually actuated in the preferred embodiment. Additional embodiments would allow a linear screw type actuator, a double acting hydraulic cylinder or a single or double acting hydraulic cylinder with a remote reservoir and pump to be utilized.

The rotisserie of the present invention may be used to rotate a work piece or piece of equipment, such an automobile body, welding fixture, fiberglass mold or the like about an axis to provide ease of access to all areas of said equipment. The preferred use is to hold and rotate an automobile.

Alternatively, the rotisserie may be used to support assembly fixtures or jigs in a manufacturing environment. Examples would be for a trailer manufacturer to have full welding access or a cabinet manufacturer to aide in assembly and finishing.

Alternatively, the rotisserie may be used in fiberglass panel and part manufacturing to support, rotate and release panels and parts from molds to aide in fabrication.

Alternatively, each end of the rotisserie may be used independently as a post type lift, for example to lift a vehicle body off the chassis.

Among the advantages of the present invention are the secure connections that may be provided by the W-L clamps/collars that are used. Such collars may be used on the vertical support column (as a neck clamp), on the swing arm (as a swing arm clamp, and on the mounting assembly (as a mounting arm clamp). In all cases the clamp/collar provides superior connection by increasing the contact surface area compared to prior art connections. This is particularly important on the swing arm, where maintaining verticality is especially important.

Among the other advantages of the present invention are the anti-binding performance that may be provided when an anti-binding bearing is included in the clamp/collar that connects the rotation assembly to the vertical support. This prevents the assembly from binding when the collar is being moved downward after the clamp and jack support are released.

Among the other advantages of the present invention is the way that the multiple grooves of bearings in the rotation assembly keeps the rotation assembly properly aligned and facilitates smoother rotation of the swing arm. Similarly, the optional use of a retainer bearing in the rotation assembly keeps the inner and outer sleeves from separating when loaded and rotating.

Finally, the balancing assembly provides advantages by keeping the load properly aligned and balanced both vertically and with respect to the axis of rotation of the object being supported by the rotisserie.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. An automobile rotisserie, comprising:

a) a pair of rectangular, vertical support columns;

b) a neck clamp clamped to each vertical support column;

c) a rotation assembly fixedly attached to each neck clamp;

d) a swing arm clamp fixedly attached to each rotation assembly;

e) a swing arm slidably received in and clamped by each swing arm clamp;

f) a balancing assembly effective for controlling the movement and positioning of said swing arm relative to said swing arm clamp; and g) a mounting assembly extending from each swing arm;

wherein at least one of said neck clamp and said swing arm clamp comprises an L-shaped outer clamp plate and a W-shaped inner clamp plate.

2. An automobile rotisserie according to claim 1 wherein each of said pair of support columns comprises a base.

3. An automobile rotisserie according to claim 1 wherein the two members of said pair of support columns are connected by a connector.

4. An automobile rotisserie according to claim 1 wherein said swing arm clamp comprises an L-shaped outer clamp plate and a W-shaped inner clamp plate.

5. An automobile rotisserie according to claim 1 wherein said neck clamp comprises an L-shaped outer clamp plate, a W-shaped inner clamp plate, and an anti-binding bearing effective for maintaining said neck clamp in a spaced apart relationship with respect to said vertical support column when the neck clamp is released from it's fully-clamped condition.

6. An automobile rotisserie according to claim 1 wherein said rotation assembly comprises:

a) an outer neck sleeve fixedly attached to said neck clamp;

b) an inner insert sleeve fixedly attached to said swing arm clamp;

c) a plurality of ball bearings between said outer sleeve and said inner sleeve to facilitate rotational movement of said inner sleeve within said outer sleeve; and d) a retainer bearing to retain said inner sleeve within said outer sleeve.

7. An automobile rotisserie according to claim 6 wherein said rotation assembly additionally comprises a locking bolt to selectively prevent rotation of said inner sleeve within said outer sleeve.

8. An automobile rotisserie according to claim 6 wherein said inner sleeve includes at least two grooves for retaining bearings, and wherein said plurality of bearings are retained in said inner sleeve groove.

9. An automobile rotisserie according to claim 6 wherein said retained bearing is retained by a concave end of a set screw.

10. An automobile rotisserie according to claim 1 wherein said balancing assembly comprises:

a) a threaded balancer block fixedly attached to said swing arm clamp;

b) an unthreaded balancer block fixedly attached to said swing arm;

c) a threaded rod extending through said threaded balancer block and through said unthreaded balancer block;

d) a gripping portion effective for turning said threaded rod;

e) a thrust bearing assembly sandwiching said unthreaded balancer block; and f) a locking collar fixed to said threaded rod adjacent said thrust bearing assembly and said unthreaded balancer block.

11. An automobile rotisserie according to claim 10 wherein said unthreaded balancer block is attached to the face of the swing arm nearest the object being supported by the rotisserie, and wherein said threaded balancing block is attached to the face of the swing arm clamp nearest the object being supported by the rotisserie, and wherein said threaded balancing block is vertically aligned with said unthreaded balancer block.

12. An automobile rotisserie according to claim 1 wherein each of said mounting arms is clamped to said swing arm by a mounting arm clamp.

13. An automobile rotisserie according to claim 1 wherein said mounting arm clamp comprises an L-shaped outer clamp plate and a W-shaped inner clamp plate.

14. An automobile rotisserie, comprising:

a) a pair of vertical support columns;

b) a rotation assembly connected to each vertical support column;

c) a swing arm clamp fixedly attached to each rotation assembly;

d) a swing arm slidably received in and clamped by each swing arm clamp; and e) a balancing assembly effective for controlling the movement and positioning of said swing arm within said swing arm clamp;

wherein said balancing assembly comprises:

i) a threaded balancer block fixedly attached to said swing arm clamp;

ii) an unthreaded balancer block fixedly attached to said swing arm;

iii) a threaded rod extending through said threaded balancer block and through said unthreaded balancer block;

iv) a gripping portion effective for turning said threaded rod;

v) a thrust bearing assembly sandwiching said unthreaded balancer block; and vi) a locking collar fixed to said threaded rod adjacent said thrust bearing assembly and said unthreaded balancer block.

15. An automobile rotisserie according to claim 14 wherein said unthreaded balancer block is attached to the face of the swing arm nearest the object being supported by the rotisserie, and wherein said threaded balancing block is attached to the face of the swing arm clamp nearest the object being supported by the rotisserie, and wherein said threaded balancing block is vertically aligned with said unthreaded balancer block.

16. An automobile rotisserie, comprising:

a) a pair of vertical support columns;

b) a rotation assembly connected to each vertical support column;

c) a swing arm clamp fixedly attached to each rotation assembly;

d) a swing arm slidably received in and clamped by each swing arm clamp; and e) a balancing assembly effective for controlling the movement and positioning of said swing arm within said swing arm clamp;

wherein said rotation assembly comprises:

i) an outer neck sleeve fixedly attached to said neck clamp;

ii) an inner insert sleeve fixedly attached to said swing arm clamp;

iii) a plurality of ball bearings between said outer sleeve and said inner sleeve to facilitate rotational movement of said inner sleeve within said outer sleeve; and iv) a retainer bearing to retain said inner sleeve within said outer sleeve.

17. An automobile rotisserie, comprising:

a) a pair of rectangular, vertical support columns;

b) a neck clamp clamped to each vertical support column;

c) a rotation assembly fixedly attached to each neck clamp;

d) a swing arm clamp fixedly attached to each rotation assembly;

e) a swing arm slidably received in and clamped by each swing arm clamp;

f) a balancing assembly effective for controlling the movement and positioning of said swing arm relative to said swing arm clamp; and g) a mounting assembly extending from each swing arm;

wherein at least one of said neck clamp and said swing arm clamp comprises an L-shaped outer clamp plate and a W-shaped inner clamp plate; and wherein said balancing assembly comprises:

i) a threaded balancer block fixedly attached to said swing arm clamp;

ii) an unthreaded balancer block fixedly attached to said swing arm;

iii) a threaded rod extending through said threaded balancer block and through said unthreaded balancer block;

iv) a gripping portion effective for turning said threaded rod;

v) a thrust bearing assembly sandwiching said unthreaded balancer block; and vi) a locking collar fixed to said threaded rod adjacent said thrust bearing assembly and said unthreaded balancer block; and wherein said rotation assembly comprises:

i) an outer neck sleeve fixedly attached to said neck clamp;

ii) an inner insert sleeve fixedly attached to said swing arm clamp;

iii) a plurality of ball bearings between said outer sleeve and said inner sleeve to facilitate rotational movement of said inner sleeve within said outer sleeve; and iv) a retainer bearing to retain said inner sleeve within said outer sleeve.

18. An automobile rotisserie according to claim 17 wherein said unthreaded balancer block is attached to the face of the swing arm nearest the object being supported by the rotisserie, and wherein said threaded balancing block is attached to the face of the swing arm clamp nearest the object being supported by the rotisserie, and wherein said threaded balancing block is vertically aligned with said unthreaded balancer block.

* * * * *